(12) United States Patent
Lee

(10) Patent No.: US 6,554,929 B2
(45) Date of Patent: Apr. 29, 2003

(54) METHOD FOR JOINING TUBE HEADERS AND HEADER TANKS OF PLASTIC HEAT EXCHANGER

(75) Inventor: Jang Seok Lee, Inchon (KR)

(73) Assignee: LG Electronics Inc., Seoul (KR)

( * ) Notice: Subject to any disclaimer, the term of this patent is extended or adjusted under 35 U.S.C. 154(b) by 29 days.

(21) Appl. No.: 09/954,056

(22) Filed: Sep. 18, 2001

(65) Prior Publication Data

US 2002/0088526 A1 Jul. 11, 2002

(30) Foreign Application Priority Data

Jan. 11, 2001 (KR) .................................... 2001-0001598
Jan. 11, 2001 (KR) .................................... 2001-0001599

(51) Int. Cl.[7] ............................................. B32B 31/16
(52) U.S. Cl. ..................... 156/73.1; 156/242; 156/308.2
(58) Field of Search ................................ 156/73.1, 73.2, 156/157, 158, 242, 308.2, 580.1, 580.2

(56) References Cited

U.S. PATENT DOCUMENTS 4,305,988 A * 12/1981 Kocher ........................ 428/158
4,333,978 A * 6/1982 Kocher ........................ 428/158
4,425,390 A * 1/1984 Changani et al. ............. 428/43

* cited by examiner

*Primary Examiner*—James Sells
(74) *Attorney, Agent, or Firm*—Birch, Stewart, Kolasch & Birch, LLP

(57) ABSTRACT

Disclosed is a method for joining tube headers and header tanks of a heat exchanger made of a plastic material by joining fin-tube units of a fin-tube assembly with tube headers in accordance with a thermal fusing method while joining the fin-tube units with each header tank in accordance with a fusing method using ultrasonic waves.

6 Claims, 6 Drawing Sheets

METHOD FOR JOINING TUBE HEADERS AND HEADER TANKS OF PLASTIC HEAT EXCHANGER

BACKGROUND OF THE INVENTION

1. Field of the Invention

The present invention relates to a method for joining tube headers and header tanks of a heat exchanger, and more particularly to a method for joining tube headers and header tanks of a heat exchanger made of a plastic material by joining fin-tube units of a fin-tube assembly with tube headers in accordance with a thermal fusing method while joining the fin-tube units with each header tank in accordance with a fusing method using ultrasonic waves.

2. Description of the Prior Art

Referring to FIG. 1, a heat exchanger used for an evaporator included in a conventional refrigerator is illustrated. As shown in FIG. 1, the heat exchanger includes a metallic refrigerant tube 1 including a refrigerant inlet tube section 2 and a refrigerant outlet tube section 3. Fins 4 are formed on the periphery of the refrigerant tube 1 along the length of the refrigerant tube 1. A left header (not shown) and a right header 6, which are made of metal, are joined to opposite lateral ends of a zigzag-shaped tube structure formed by the refrigerant tube 1, respectively. Also, defrosting tubes 7 are arranged at the opposite lateral ends of the zigzag-shaped tube structure, respectively.

Now, the conventional heat exchanger having the above mentioned arrangement will be described in brief.

A refrigerant is introduced into the refrigerant tube 1 via the refrigerant inlet section 2 corresponding to the inlet of an evaporator. The refrigerant passes through a zigzag-shaped refrigerant path defined in the refrigerant tube 1, and then reaches the refrigerant outlet tube section 3. The refrigerant is subjected to an evaporation process while passing though the refrigerant tube 1. During the evaporation process, the refrigerant conducts heat exchange based on exchange between latent heat and sensible heat. The refrigerant emerging from the refrigerant outlet tube section 3 is then introduced into an accumulator 8. The accumulator 8 functions as a refrigerant storage tank coping with a variation in load depending on the surroundings around the associated refrigerator while functioning as a moisture-liquid separator. The defrosting tubes 7 have to periodically defrost ice attached to the surface of the evaporator. For this reason, electrical heating type heaters are used for the defrosting tubes 7. The tip of each fin is substantially in linear contact with an associated one of the defrosting tubes 7.

FIGS. 2 and 3 illustrate another heat exchanger used for an evaporator included in a conventional refrigerator, respectively. The illustrated heat exchanger is a tri-tube evaporator in which a refrigerant tube, fins, and defrosting tubes are integral together.

As shown in FIGS. 2 and 3, fins 12 are formed on the periphery of a metallic refrigerant tube 11 along the length of the metallic refrigerant tube 11. A defrosting tube 13 is formed at the periphery of each fin 12.

A refrigerant is introduced into the evaporator at a left end of the evaporator via the left end of a tri-tube 10. The refrigerant passes through the tri-tube 10 defining a zigzag-shaped refrigerant path, and then emerges from the evaporator via an accumulator 15 arranged at the outlet of a refrigerant tube 14 connected to the right end of the tri-tube 10.

As apparent from the above description, conventional fin-tube type evaporators have a structure in which fins 12 are coupled to the metallic refrigerant tube 11 in accordance with a diameter enlargement of the metallic refrigerant tube 11. In particular, the accumulator 15 is joined to the outlet of the refrigerant tube 11 by means of welding. For this reason, noise is generated when the refrigerator is turned on and off. Moreover, such a conventional joining method cannot be applied to heat exchangers made of a plastic material, as in the present invention.

SUMMARY OF THE INVENTION

Therefore, the present invention has been made in view of the above mentioned problems, and an object of the invention is to provide a method for joining tube headers and header tanks of a heat exchanger made of a plastic material by bring the tube headers and header tanks into contact with associated fin-tube units of a fin-tube assembly, pressing the tube headers and header tanks against the associated fin-tube units by a thermal fusing machine, thereby thermally fusing the tube headers and header tanks to the associated fin-tube units.

In accordance with one aspect, the present invention provides a method for joining tube headers of a plastic heat exchanger, comprising the steps of: forming fins of a plastic material on respective outer peripheral surfaces of refrigerant tubes made of a plastic material and arranged in a laminated fashion while allowing each of the fins to connect associated adjacent ones of the refrigerant tubes, thereby forming a fin-tube assembly having a plurality of fin-tube units each consisting of one refrigerant tube and one fin; forming tube headers of a plastic material at opposite ends of each of the fin-tube units in accordance with a double injection molding process, respectively; arranging a thermal fusing jig to support respective bottoms of the tube headers at each end of the fin-tube assembly; and pressing thermal fusing molding dies of a thermal fusing machine against the fin-tube units at each end of the fin-tube assembly, thereby thermally fusing the tube headers to the fin-tube units, so that the tube headers are integral with the fin-tube units, respectively.

Each of the thermal fusing molding dies may have an inverted-triangular cross-sectional shape.

The step of thermally fusing the tube headers to the fin-tube units may be carried out under a condition, in which respective portions of the tube headers and fin-tube units being thermally fused are maintained at a temperature of 300 to 320° C., until respective portions of the tube headers and fin-tube units being thermally fused exhibit a thickness reduction of 50%.

In accordance with another aspect, the present invention provides a method for joining tube headers of a plastic heat exchanger, comprising the steps of: forming fins of a plastic material on respective outer peripheral surfaces of refrigerant tubes made of a plastic material and arranged in a laminated fashion while allowing each of the fins to connect associated adjacent ones of the refrigerant tubes, thereby forming a fin-tube assembly having a plurality of fin-tube units each consisting of one refrigerant tube and one fin; forming tube headers at opposite ends of each of the fin-tube units in accordance with a double injection molding process, respectively; arranging header tanks of a plastic material at opposite ends of the fin-tube assembly while bringing each of the header tanks into contact with the tube headers arranged at an associated one of the opposite ends of the fin-tube assembly; and arranging a heat generating device on each of the header tanks, and thermally fusing the header tank to the tube headers arranged at the associated end of the fin-tube assembly in accordance with an operation of the heat generating device.

The heat generating device may be a piezoelectric device.

Preferably, the piezoelectric device generates vibrations having mechanical vertical vibration energy of 15,000/sec and an exciting amplitude of 0.06 to 0.08 mm (p—p: peak to peak).

The present invention has features in that respective materials of elements in the heat exchanger are plastic materials, and that pins and refrigerant tubes of the heat exchanger are integrally formed in accordance with a plastic extrusion process. In accordance with such features, the present invention provides a method for joining tube headers of a plastic heat exchanger by overlapping tube headers with respective ends of tubes being extruded, and applying heat to the overlapped portions. Also, the present invention provides a method for joining the tube headers to a header tank, in accordance with a thermal fusing process using ultrasonic waves.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1:
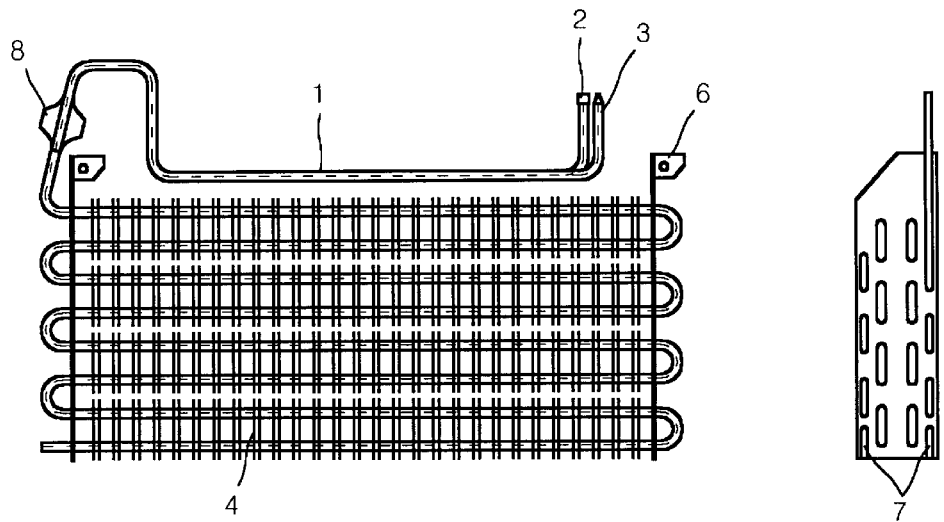
FIG. 1 is a view schematically illustrating a conventional heat exchanger used for an evaporator included in a refrigerator.
Figure 2:
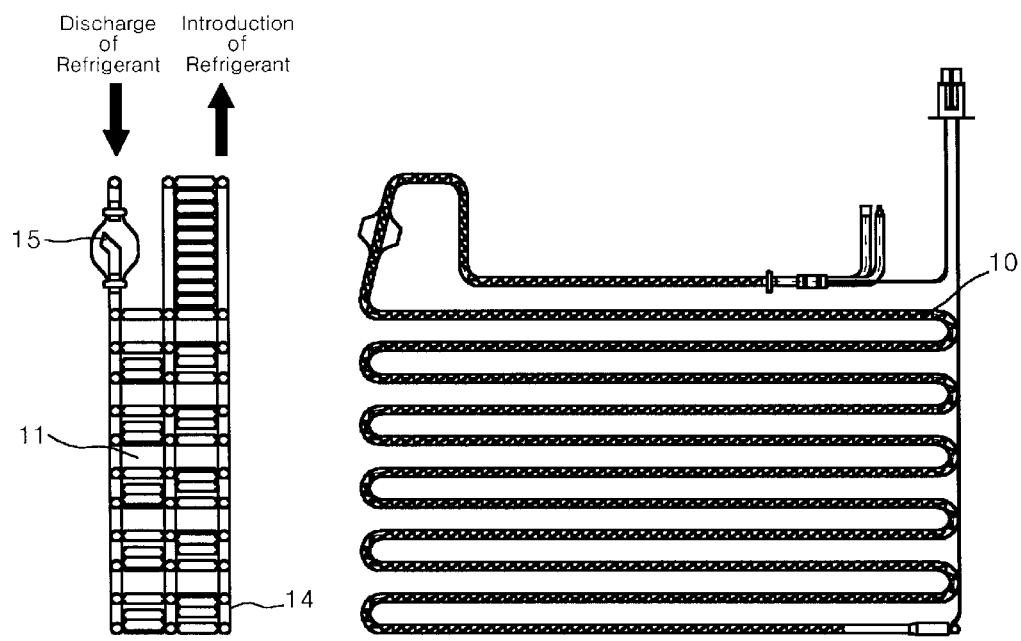
FIG. 2 is a view schematically illustrating another conventional heat exchanger used for an evaporator included in a refrigerator.
Figure 3:
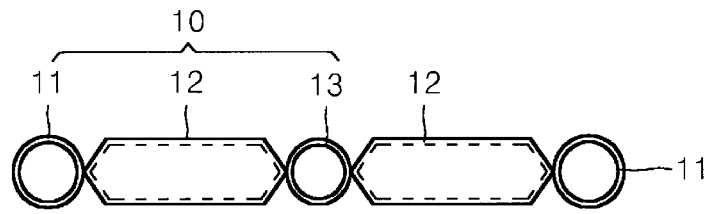
FIG. 3 is a view illustrating the concept of a tri-tube applied to the heat exchanger of FIG. 2.
Figure 4:
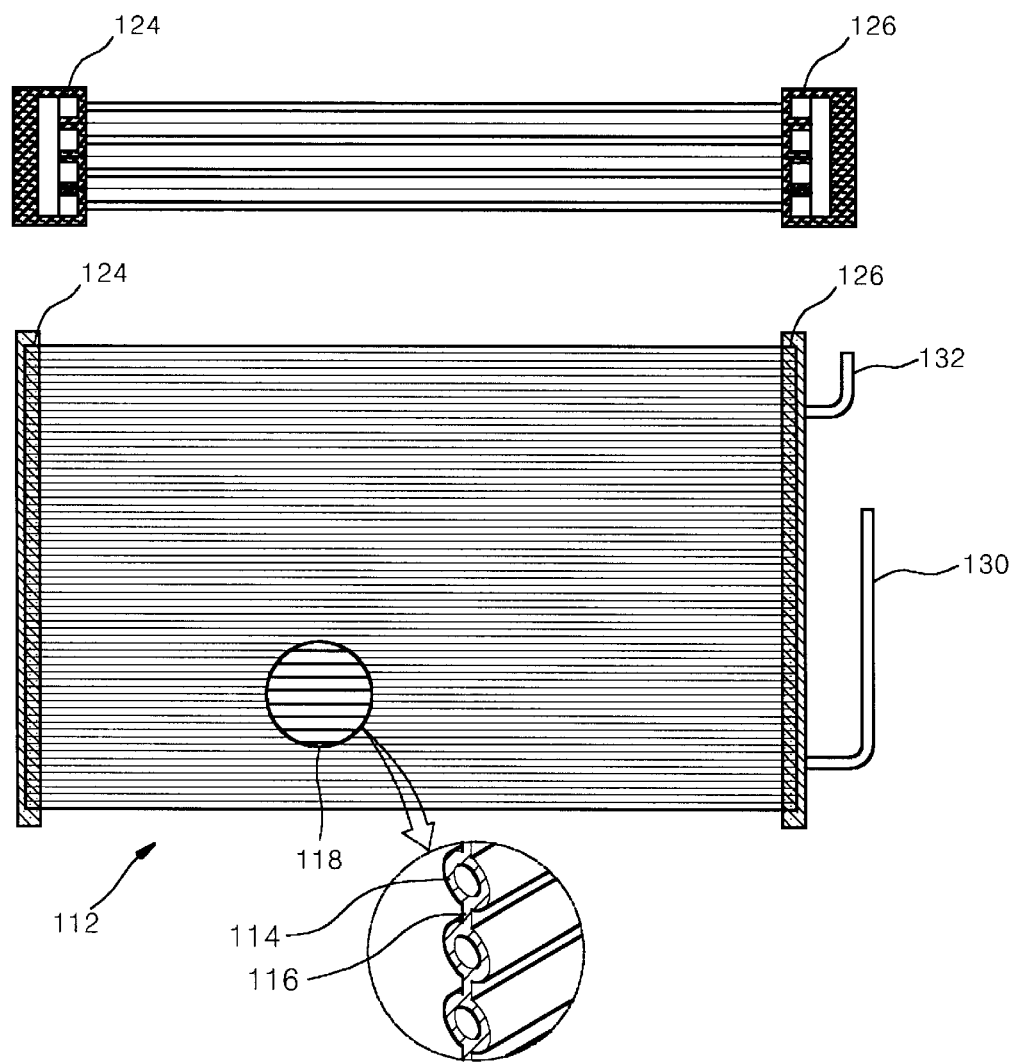
FIG. 4 is a view schematically illustrating a plastic heat exchanger according to the present invention.
Figure 5:
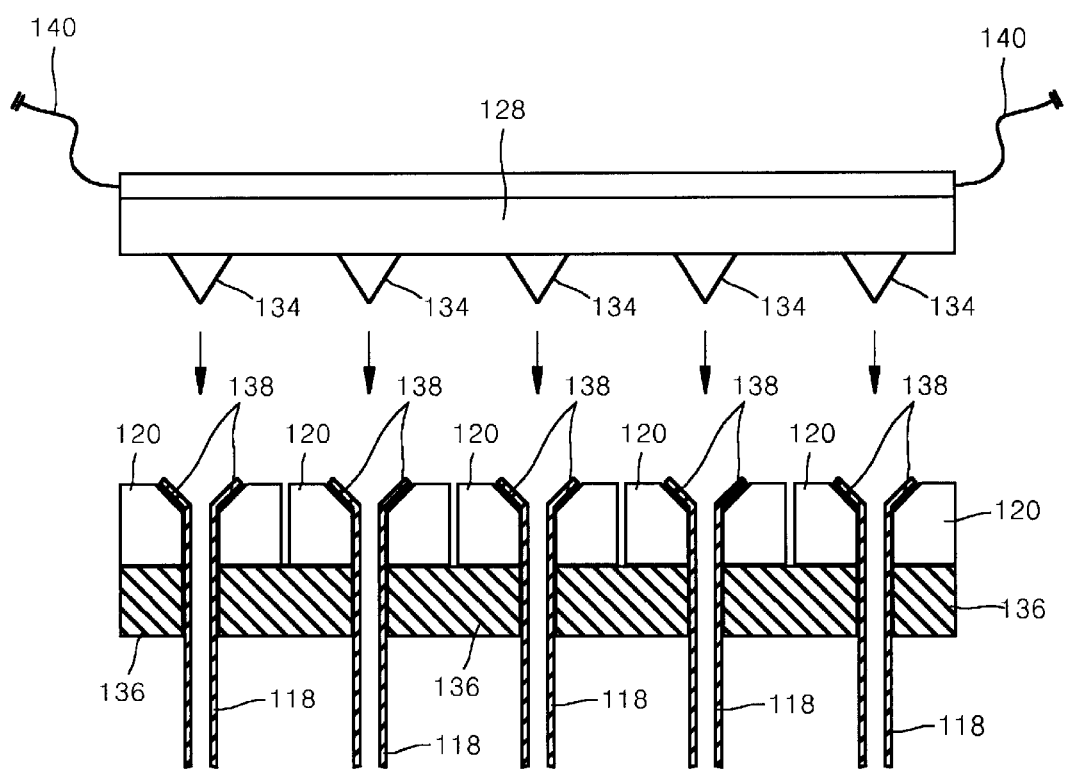
FIG. 5 is a view illustrating the process of coupling fin-tube units and tube headers of the plastic heat exchanger according to the present invention.

Referring to FIG. 4, a plastic heat exchanger according to the present invention is illustrated. Referring to FIG. 4, the plastic heat exchanger, which is denoted by the reference numeral 112, includes a plurality of refrigerant tubes 114 made of a plastic material and arranged in a laminated fashion. A fin 116 made of a plastic material is arranged between adjacent ones of the refrigerant tubes 114 in such a fashion that it is integral with the refrigerant tubes 114 associated therewith. Thus, a fin-tube assembly are formed. Tube headers 120 are fitted around opposite ends of each refrigerant tubes 114, respectively, as shown in FIG. 5. Left and right header tanks 124 and 126 are joined to the tube headers 120 at opposite ends of the fin-tube assembly, respectively.

The configuration of the plastic heat exchanger 112 will now be described in more detail. As shown in FIG. 4, the fins 116 are formed at respective outer surfaces of the refrigerant tubes 114 while being spaced apart from one another by a desired distance. It should be noted that all elements of the heat exchanger are made of a plastic material. As mentioned above, the fins 116 and the refrigerant tubes 114 for one body. Therefore, the fin-tube assembly is a set of fin-tube units each consisting of one of the refrigerant tubes 114 and one of the fins 116. Each fin-tube unit of the fin-tube assembly is denoted by the reference numeral 118.

The left header tank 124 is coupled to the left end of the fin-tube assembly 118, and the right header tank 126 is coupled to the right end of the fin-tube assembly 118. A refrigerant inlet tube 130 is connected to the lower portion of the right header tank 126. A refrigerant outlet tube 132 is connected to the upper portion of the left leader tank 126.

Now, a method for joining the tube headers 120 to the fin-tube assembly will be described in detail with reference to FIG. 5. The joining of the tube headers 120 to the fin-tube assembly is carried out in accordance with a double injection molding process.

Joints formed by joining of the tube headers 120 to the fin-tube assembly using the double injection molding process exhibit a low strength. Accordingly, each tube header is joined again, at a desired portion thereof, for example, an upper portion thereof (FIG. 5), to the end of the corresponding fin-tube unit 118 through a thermal fusing method. In accordance with the thermal fusing method, the tube headers 120 are laid on a thermal fusing jig die 136 so that they are firmly supported by the jig die 136. In this state, the upper tube end of each the fin-tube unit 118 is pressed against the corresponding tube headers 120, using a thermal fusing machine 128 provided with thermal fusing molding dies 134 having an inverted-triangular shape.

The thermal fusing molding dies 134 are arranged to be aligned with the uniformly-spaced fin-tube units 118 of the fin-tube assembly. When electric power is supplied to the thermal fusing machine 128 while the thermal fusing machine 128 is pressed against the upper ends of the fin-tube units 118, the upper end of each fin-tube unit 118 expands due to the heat and comes into contact with the corresponding tube header 120, so that it is thermally fused to the tube header 120. In FIG. 5, the reference numeral 138 denotes a joint formed in accordance with the thermal fusing between each fin-tube unit 118 and the corresponding tube header 120.

The portions of the tube headers 120 and fin-tube units 118 being thermally fused are maintained at a temperature of 300 to 320° C., until respective portions of the tube headers and fin-tube units being thermally fused exhibit a thickness reduction of 50 percents.

The coupling of the fin-tube units 118 to each of the header tanks 124 and 126 will now be described in detail.

Figure 6:
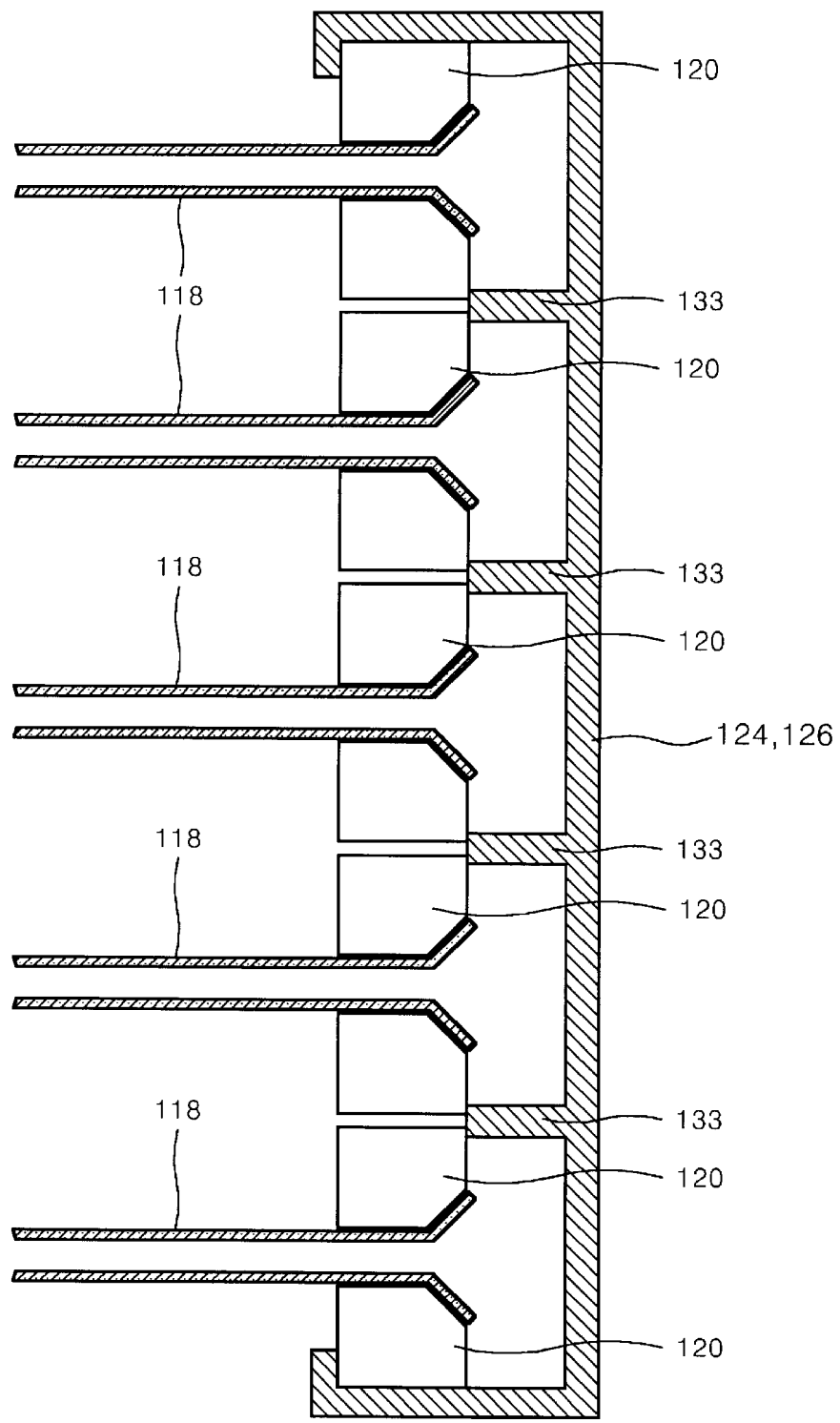
FIG. 6 is a view illustrating the coupled state of the fin-tube units, tube headers, and header tank of the plastic heat exchanger according to the present invention.

Referring to FIGS. 4 and 6, in order to couple the fin-tube units 118 to each of the header tanks 124 and 126, the tube headers 120 are provided at the ends of each fin-tube unit 118. As described above, the tube headers 120 and the fin-tube units 118 are formed into one unit using a double injection molding process.

Each of the header tanks 124 and 126 are fused to the tube headers 120 formed at the corresponding one of the fin-tube assembly. The fusing of the header tanks 124 and 126 to the tube headers 120 is carried out in a fashion illustrated in FIGS. 7 and 8.

Figure 7:
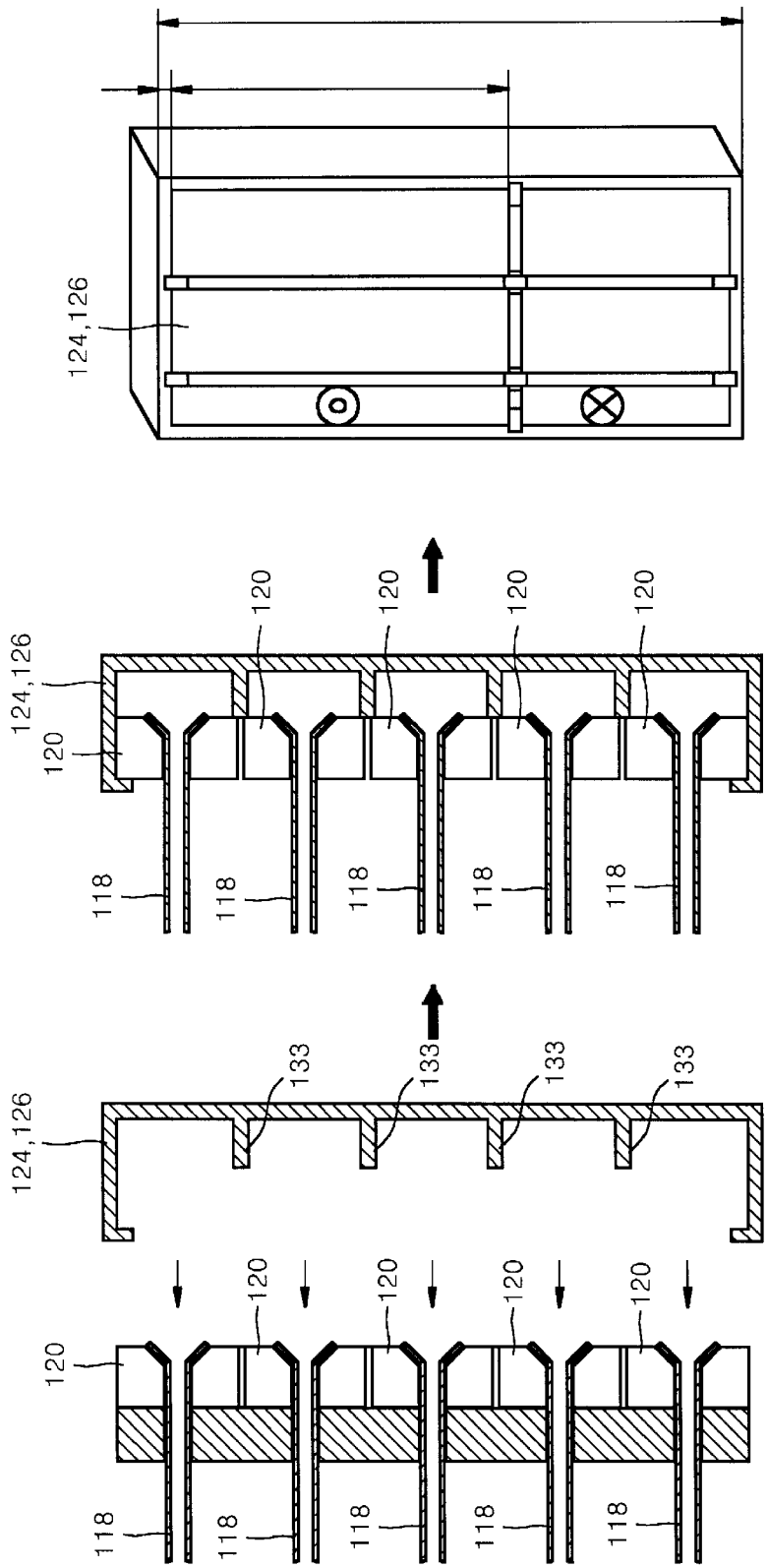
FIG. 7 is a view illustrating the process of coupling the fin-tube units, tube headers, and header tanks of the plastic heat exchanger according to the present invention.
Figure 8:
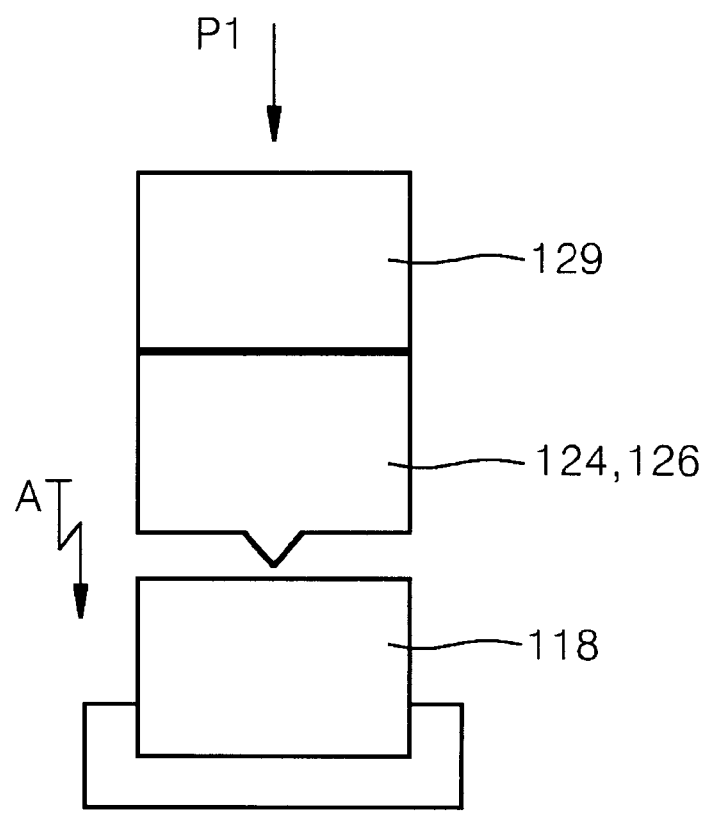
FIG. 8 is a view illustrating the process of joining the tube headers and header tanks of the plastic heat exchanger according to the present invention, using a piezoelectric device.

Each of the header tanks 124 and 126 has a plurality of partition walls 133 (FIG. 6) extending from the inner top surface of the header tank. When each of the header tanks 124 and 126 is to be fused to the corresponding tube headers 120, it is first positioned in such a fashion that each partition wall 133 thereof comes into contact with adjacent ones of the tube headers 120, as shown in FIG. 7. In this state, mechanical vibration energy is applied to each of the header tanks 124 and 126, using a piezoelectric device 129, as shown in FIG. 8. Thus, each of the header tanks 124 and 126 is joined to the corresponding tube headers 120 in accordance with an ultrasonic molding process.

The piezoelectric device 129 converts electrical energy into mechanical vertical vibration energy of 15,000/sec for applying to each of the header tanks 124 and 126. During the application of the mechanical vertical vibration energy, each of the header tanks 124 and 126 is joined to the corresponding tube headers 120. In this case, the exciting amplitude of vibrations is 0.06 to 0.08 mm (p—p: peak to peak). The fusing of samples by frictional heat is completed within a maximum of 1 second.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for joining tube headers of a plastic heat exchanger, comprising the steps of:

forming fins made of a plastic material on respective outer peripheral surfaces of refrigerant tubes made of a plastic material and arranged in a laminated fashion while allowing each of fins to connect to corresponding refrigerant tubes, thereby forming a fin-tube assembly having a plurality of fin-tube units each consisting of one refrigerant tube and one fin;

forming tube headers made of a plastic material at opposite ends of each of the fin-tube units in accordance with a double injection molding process, respectively;

arranging a thermal fusing jig to support the bottoms of the tube headers at each end of the fin-tube assembly; and pressing thermal fusing molding dies of a thermal fusing machine against the fin-tube units at each end of the fin-tube assembly, thereby thermally fusing the tube headers to the fin-tube units, so that the tube headers are integral with the fin-tube units, respectively.

2. The method according to claim 1, wherein a cross-section of each of the thermal fusing molding dies has an inverted-triangular shape.

3. The method according to claim 1, wherein the step of thermally fusing the tube headers to the fin-tube units is carried out under a condition, in which respective portions of the tube headers and fin-tube units being thermally fused are maintained at a temperature of 300 to 320° C., until the portions of the tube headers and fin-tube units being thermally fused exhibit a thickness reduction of 50%.

4. A method for joining tube headers of a plastic heat exchanger, comprising the steps of:

forming fins that made of a plastic material on respective outer peripheral surfaces of refrigerant tubes made of a plastic material and arranged in a laminated fashion while allowing each of the fins to connect associated adjacent ones of the refrigerant tubes, thereby forming a fin-tube assembly having a plurality of fin-tube units each consisting of one refrigerant tube and one fin;

forming tube headers at opposite ends of each of the fin-tube units in accordance with a double injection molding process, respectively;

arranging header tanks made of a plastic material at opposite ends of the fin-tube assembly while bringing each of the header tanks into contact with the tube headers arranged at an associated one of the opposite ends of the fin-tube assembly; and arranging a heat generating device on each of the header tanks, and thermally fusing the header tank to the tube headers arranged at the corresponding end of the fin-tube assembly in accordance with an operation of the heat generating device.

5. The method according to claim 4, wherein the heat generating device is a piezoelectric device.

6. The method according to claim 5, wherein the piezoelectric device generates vibrations having mechanical vertical vibration energy of 15,000/sec and an exciting amplitude of 0.06 to 0.08 mm (p—p: peak to peak).

* * * * *